United States Patent
Wu (10) Patent No.: US 7,154,880 B2
(45) Date of Patent: Dec. 26, 2006

(54) NON-SERVER TYPE VOICE PACKET COMMUNICATION DEVICE AND METHOD

(75) Inventor: Wei-En Wu, Chung-Ho (TW)

(73) Assignee: Vodtel Communications Inc., Chung-Ho (TW)

( * ) Notice: Subject to any disclaimer, the term of this patent is extended or adjusted under 35 U.S.C. 154(b) by 1061 days.

(21) Appl. No.: 10/216,293

(22) Filed: Aug. 12, 2002

(65) Prior Publication Data

US 2004/0028029 A1    Feb. 12, 2004

(51) Int. Cl.
*H04L 12/66* (2006.01)
(52) U.S. Cl. .................. 370/352; 370/356; 370/401
(58) Field of Classification Search ................ 370/351, 370/352, 353, 354, 356, 360, 389, 401
See application file for complete search history.

(56) References Cited

U.S. PATENT DOCUMENTS

| | | | |
|---|---|---|---|
| 6,614,781 B1 * | 9/2003 | Elliott et al. ................ | 370/352 |
| 6,937,596 B1 * | 8/2005 | Sjolund et al. ............. | 370/352 |
| 6,975,636 B1 * | 12/2005 | Eom .......................... | 370/401 |
| 6,999,431 B1 * | 2/2006 | Rines ......................... | 370/328 |
| 2003/0235177 A1 * | 12/2003 | Park ........................... | 370/338 |

* cited by examiner

*Primary Examiner*—Chau Nguyen
*Assistant Examiner*—Nguyen Ngo
(74) *Attorney, Agent, or Firm*—Bacon & Thomas, PLLC (57) ABSTRACT

A non-server type voice packet communication method, including an IP address inquiring step, an IP address analyzing step, an IP address receiving step, and a voice packet transmitting step. According to the method, the IP address inquiring step firstly transmits an IP address inquiring signal to a non-server type voice packet communication device through a PSTN. Then, the IP address analyzing step determines whether an IP address data is transmitted from the non-server type voice packet communication device using digital modulation signals or not. When the non-server type voice packet communication device using digital modulation signals, the IP address receiving step receives the IP address data. Finally, the voice packet transmitting step transmits voice packets to the non-server type voice packet communication device according to the IP address data through digital network. This invention also discloses a non-server type voice packet communication device for carrying out the mentioned method.

20 Claims, 5 Drawing Sheets

| IP address data | Telephone number |
|---|---|
| 123.123.123.1 | 12345678 |
| 200.200.200.2 | 87654321 |
| ------- | ------- |

NON-SERVER TYPE VOICE PACKET COMMUNICATION DEVICE AND METHOD

BACKGROUND OF THE INVENTION

1. Field of Invention

The invention relates to a non-server type voice packet communication device and method. More particularly, it relates to a voice communication device and method that first obtains IP address data using digital modulation signals through a PSTN (Public Switched Telephone Network) and then follows the IP address data to establish a voice packet communication through the network.

2. Related Art

In comparison with the conventional PSTN, transmitting voice signals over a digital network using a VoIP (Voice on Internet Protocol) has a lower cost. Therefore, with the advance in network technologies, the VoIP technology has been widely applied to Internet telephones, web faxing or videoconferences to lower the cost for communications and signal transmissions.

For the Internet telephones, a VoIP gateway is used to convert the analog voice signals of the telephones into a voice packet, which is then transmitted to another VoIP gateway through a digital network. The later VoIP gateway converts the received voice packet back into analog voice signals. Therefore, the user of the second telephone can receive the voice signals so as to communicate with the user of the first telephone.

However, along with the development in network communities and normal enterprise network systems and the prevalent use of modems when to connecting to the Internet, users find new problems when using Internet telephones to communicate with one another. A network server may assign the IP address of the VoIP gateway when it connects to the Internet using a modem or through a LAN (Local Area Network). The VoIP gateway then has a new IP address assigned by the network server each time it connects to the Internet. The VoIP gateway may use the IP address assigned by the network server for internal communication in a LAN, but not for global communication in a WAN (Wide Area Network). In other words, the IP address of the VoIP gateway is not the one registered at or assigned by the InterNIC (Internet Network Information Center). Therefore, the IP address of the VoIP gateway is only public to the LAN but not the WAN. If the IP address of the VoIP gateway is not fixed or not public to the WAN, another electronic device may not be able to establish signal communications with that VoIP gateway.

In response to the above problem, the Internet telephone merchants proposed a solution: dial up the serial number of the hardware first, such as a computer network interface or VoIP gateway, to establish the Internet telephone connection. Although the above method can solve the problem due to unfixed IP addresses, this architecture requires a server to record the hardware's serial number and its IP address so that one can look up the IP address when making an Internet phone call. Once the server cannot function properly, the user will not be able to make the Internet phone calls. It is also very difficult for a user to remember the serial number of the hardware. Moreover, once the hardware is changed, the serial number will be different. As described above, the method creates a lot of inconvenience for the users.

As to the problem that the Internet telephone hardware device IP address is not public to the WAN, the Internet telephone merchants have not found an effective solution. The currently available WAN IP address formats are insufficient for the large number of user computers.

In view of the foregoing, how to facilitate the Internet telephone calls and, in particular how to avoid remembering tedious serial numbers and to conquer the problem of insufficient WAN IP addresses form an important subject to be studied.

SUMMARY OF THE INVENTION

An objective of the invention is to provide a non-server type voice packet communication device and method that can use the same telephone number as the conventional telephones to make Internet phone calls, wherein the address data of the Internet phone call device is transmitted as a way of digital modulation signals.

To achieve the above objective, the invention provides a non-server type voice packet communication method, which includes an IP address inquiring step, an IP address analyzing step, an IP address receiving step and a voice packet transmitting step. The IP address inquiring step transmits an IP address inquiring signal to a non-server type voice packet communication device through PSTN. Then the IP address analyzing step determines whether an IP address data sent from the non-server type voice packet communication device is transmitted by means of using digital modulation signals or not. When the IP address data is transmitted by means of using digital modulation signals, the IP address receiving step receives the IP address data. The voice packet transmitting step transmits at least one voice packet to the non-server type voice packet communication device according to the IP address data through digital network.

The invention also provides a non-server type voice packet communication device, which includes an IP address inquiring module, an address data analyzing module, an IP address receiving module, and a voice packet transmitting module. The IP address inquiring module transmits an IP address-inquiring signal to another non-server type voice packet communication device. The address data analyzing module determines whether an IP address data sent from the non-server type voice packet communication device is transmitted by means of using digital modulation signals or not. When the IP address data is transmitted by means of using digital modulation signals, the IP address receiving module receives the IP address data. The voice packet transmitting module transmits at least one voice packet to a non-server type voice packet communication device according to the IP address.

Since the disclosed non-server type voice packet communication device can receive and analyze the IP address data (the LAN IP address and the corresponding WAN IP address of the network address translator) of another non-server type voice packet communication device through PSTN using digital modulation signals, it therefore, even if the non-server type voice packet communication device connects to digital network through a NAT (Network Address Translator), two non-server type voice packet communication devices can still make Internet phone calls to each other without being affected by the NAT.

The disclosed non-server type voice packet communication device allows users to make Internet phone calls in the same way as making a conventional phone call. In other words, the user only needs to remember the original telephone number and calls in the traditional way. So the invention greatly simplifies the method and efficiency of making Internet phone calls.

BRIEF DESCRIPTION OF THE DRAWINGS

The invention will become more fully understood from the detailed description given hereinbelow illustration only, and thus are not limitative of the invention, and wherein.

DETAILED DESCRIPTION OF THE INVENTION

The invention will be apparent from the following detailed description, which proceeds with reference to the accompanying drawings, wherein the same references relate to the same elements.

At first, the instruction of a non-server type voice packet communication device is described. After that, the procedure of a non-server type voice packet communication method.

Figure 1:
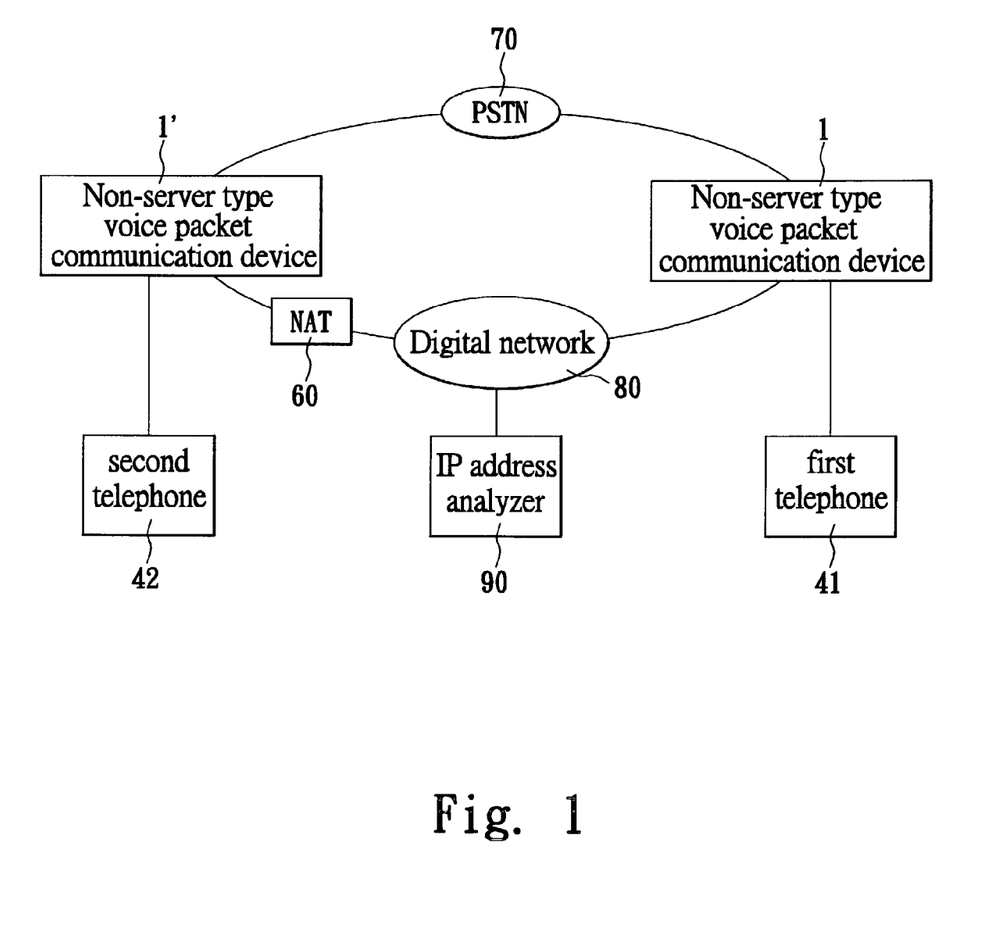
FIG. 1 is a schematic view showing the combination of the disclosed non-server type voice packet communication device and PSTN, digital network and a telephone according to a preferred embodiment of the invention.

With reference to FIG. 1, a non-server type voice packet communication device 1 and another non-server type voice packet communication device 1' are connected to a first telephone 41 and a second telephone 42, respectively. Both the telephones are connected to PSTN (Public Switched Telephone Network) 70. Furthermore, the non-server type voice packet communication device 1' connects to digital network 80 through a NAT (Network Address Translator) 60. The non-server type voice packet communication device 1 connects directly to digital network 80.

Since the non-server type voice packet communication device 1' couples to digital network 80 via the NAT 60, other electronic devices connecting to digital network cannot know the IP address of the non-server type voice packet communication device 1'. They can only know the IP address converted by the NAT 60. The NAT 60 records the port used by the non-server type voice packet communication device 1' so as to determine whether any received packet needs to be transmitted to the non-server type voice packet communication device 1.

Figure 2:
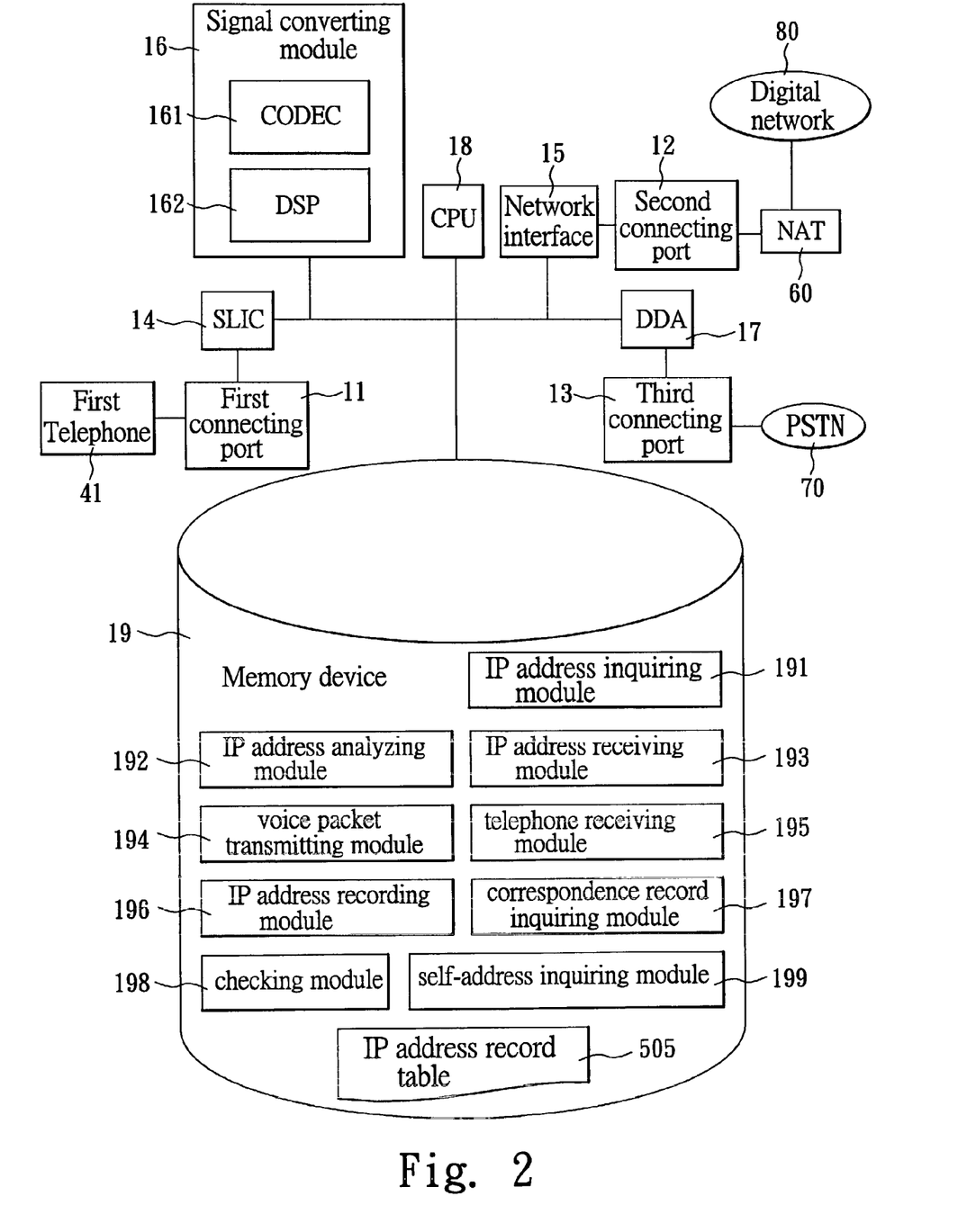
FIG. 2 is a schematic view showing the non-server type voice packet communication device according to a preferred embodiment of the invention.

As shown in FIG. 2, the non-server type voice packet communication device 1 includes a first connecting port 11, a second connecting port 12, a third connecting port 13, an SLIC (Subscriber Line Interface Circuit) 14, a network interface 15, a signal converting module 16, a DAA (Data Access Arrangement) 17, a CPU (Central Processing Unit) 18 and a memory device 19. In the current embodiment, the first connecting port 11 is an RJ-11 connecting port that couples the SLIC 14 and the first telephone 41, transmitting analog voice signals from and to the first telephone 41. The second connecting port 12 is an RJ-45 connecting port that couples the network interface 15 and digital network 80 through the NAT 60, transmitting digital voice packets from and to digital network 80. The third connecting port 13 is an RJ-11 connecting port that couples the DAA 17 and PSTN 70, transmitting analog voice signals from and to PSTN 70. It should be noted that the mentioned analog voice signals include any one of telecommunication signals, such as DTMF signals or FSK signals. People who skill in the art should know that FSK signals might carry more messages than DTMF signals, and the transmitting speed of FSK signals is faster than that of DTMF signals.

The signal converting module 16 mainly converts between digital voice packets and analog voice packets. It includes a CODEC 161 and a DSP (Digital Signal Processor) 162. The CODEC 161 converts analog voice signals into digital voice signals. For example, when analog voice signals from the first telephone 41 through the first connecting port 11 and the SLIC 14 are received, the CODEC 161 first samples the analog voice signals and then converts sampled results into digital voice signals. In addition, the CODEC 161 also processes digital voice signals, such as packaging digital voice signals into digital voice packets that can be transmitted over digital network, gain control, echo cancellation, voice activity detection, and background comfort noise generation. All the details of the above-mentioned signals processing are well known to people skilled in the VoIP technology and therefore are not repeated herein.

The CPU 18 performs the management of a calling procedure and data transmission among the telephones PSTN 70, and digital network 80. In accordance with the phone number the user dials, the CPU 18 can add in an appropriate header in the digital voice packet transmitted from the signal converting module 16 so that the digital voice packet can be sent to the correct destination in digital network 80.

Figure 3:
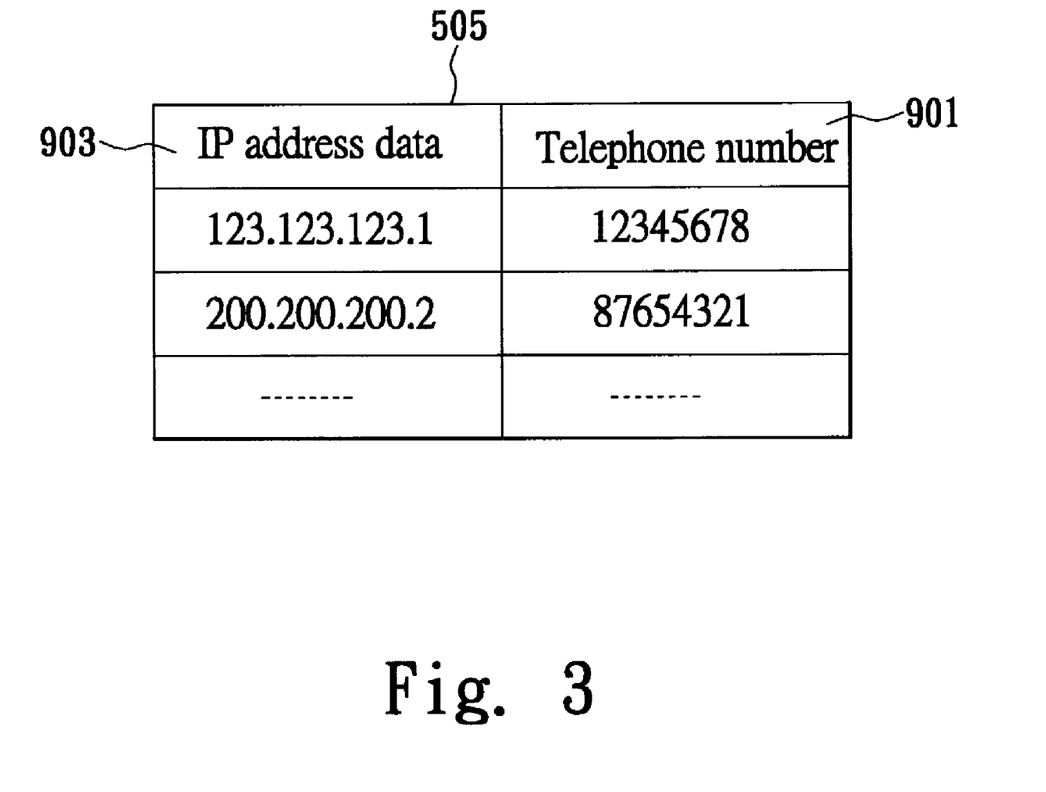
FIG. 3 is a schematic view showing the data recorded in an IP address record table of the non-server type voice packet communication device according to a preferred embodiment of the invention.

The memory device 19 stores an IP address record table 505. Referring to FIG. 3, the IP address record table 505 stores the correspondent relations between IP address data 903 and telephone numbers 901. These correspondent relations can be entered by users or be automatically stored from previous conversion records. Moreover, in the embodiment, the memory device 19 also stores a plurality of program modules, including an IP address inquiring module 191, an IP address analyzing module 192, an IP address receiving module 193, a voice packet transmitting module 194, a telephone receiving module 195, an IP address recording module 196, a correspondence record inquiring module 197, a checking module 198, and a self-address inquiring module 199. After the CPU 18 reads in all program modules, the CPU can control each hardware device to execute each step in the non-server type voice packet communication method 30 described hereinafter.

In this case, the memory device 19 may further store an IP address outputting module (not shown). The IP address outputting module outputs the IP address data of the non-server type voice packet communication device 1 to the non-server type voice packet communication device 1' using digital modulation signals.

In order to make the content in the method proposed by the invention more comprehensible, an explicit embodiment is given below to describe the procedure of the non-server type voice packet communication method 30.

Figure 4:
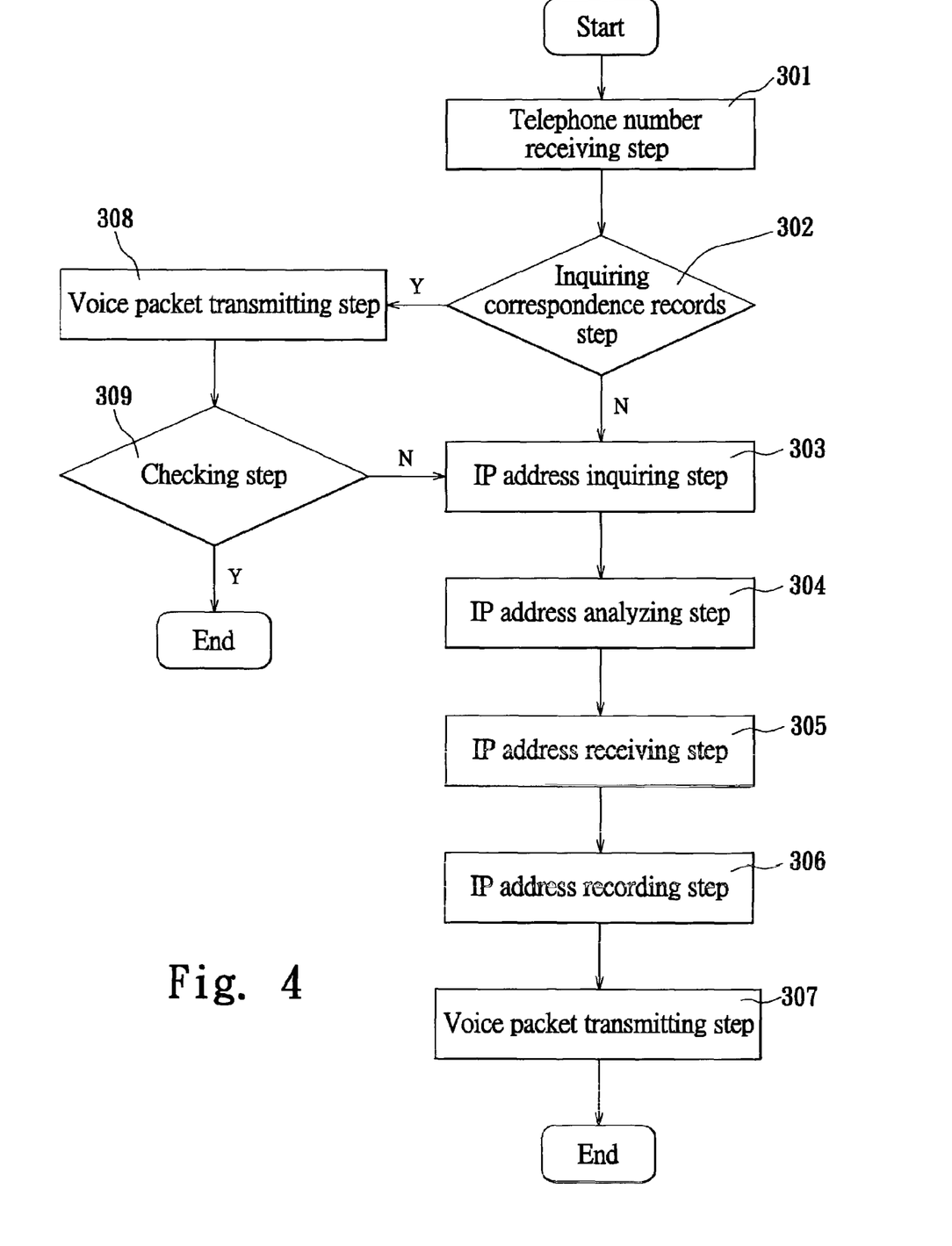
FIG. 4 is a flowchart showing the procedure of the non-server type voice packet communication method according to a preferred embodiment of the invention.

As shown in FIG. 4, the method 30 first performs the step of receiving a telephone number (step 301) to receive the telephone number 901 of the first telephone 41. In this step, the user can use the CCITT standard keypad on the first telephone 41 to dial the phone number and, in addition, a special ID code to tell the non-server type voice packet communication device 1 that it is an Internet phone call. For instance, the user can press "*" before the telephone number 901, meaning that an Internet phone call is desired.

After receiving the telephone number 901 entered by the user, the step of inquiring correspondence records checks the IP address record table 505 as to whether correspondent relations between the IP address data 903 and the telephone numbers 901 already exist (step 302). As described before, the IP address record table 505 in the non-server type voice packet communication device 1 stores the correspondence relations between the IP address data 903 and the telephone numbers 901.

When corresponding relationship between the IP address data 903 and the telephone numbers 901 exists in the IP address record table 505, the message (telephone number 901) is transmitted to the non-server type voice packet communication device 1' in voice packet transmitting step 308 according to the IP address data 903 stored in the IP address record table 505. Afterwards, the step of checking is performed (step 309) and a voice transmission channel is established to transmit voice packets 904. The checking step 309 checks whether the voice packet 904 can be successfully sent to the non-server type voice packet communication device 1'. When the voice packet 904 cannot be successfully sent to the non-server type voice packet communication device 1', the IP address inquiring step 303 is performed to obtain the current IP address data 903 of the non-server type voice packet communication device 1'. In general, if the power of the non-server type voice packet communication device 1' or the NAT 60 has been turned off, the port used by the non-server type voice packet communication device 1' on the NAT 60 may be changed or the record in the IP address record table 505 may not be correct. Therefore, the IP address-inquiring step 303 has to be performed again.

It should be emphasized that any skilled person can use different methods to implement the checking step 309. For example, the non-server type voice packet communication device 1 can transmit the telephone number 901 stored in the IP address record table 505 to the non-server type voice packet communication device 1' in advance The non-server type voice packet communication device 1' then checks whether the received telephone number 901 is its own telephone number. This can prevent incorrect packet transmissions.

Alternatively, when the IP address record table 505 does not have the corresponding relationship between IP address data 903 and telephone numbers 901, the step of inquiring IP address data is performed (step 303) to send an IP address inquiring signal 902 to the non-server type voice packet communication device 1' using dial tones. In this step, the IP address-inquiring signal 902 is a set of predetermined analog voice signals, such as DTMF signals or FSK signals. When the non-server type voice packet communication device 1' receives the IP address inquiring signal 902, the communication device 1' does not try to establish the conversion channel to the second telephone 42 but processes the signal on its own. The IP address of the communication device 1' and its IP address and port on the NAT 60 are sent to the non-server type voice packet communication device 1 using digital modulation signals outputted by the IP address outputting module of the communication device 1'. In this case, the IP address data could be transmitted using any of digital modulation signal forms. To be concerned, FSK, ASK, and PSK signals, which respectively use frequency-shifting, amplitude-shifting, and phase-shifting to carry and transmit digital data, are the most popular digital modulation signals.

Afterwards, the IP address analyzing step 304 determines whether the IP address data 903 from the non-server type voice packet communication device 1' is transmitted using digital modulation signals or not. When the IP address data 903 is transmitted using digital modulation signals, such as FSK signals, the IP address receiving step 305 receives the IP address data 903 transmitted from the non-server type voice packet communication device 1'. The IP address data 903 includes the IP address of the non-server type voice packet communication device 1', its IP address on the NAT 60, and the port used by the non-server type voice packet communication device 1' on the NAT 60. The IP address recording step 306 stores the received IP address data 903 in the IP address record table 505.

After receiving the IP address data 903, the voice packet transmitting step 307 sends the voice packet 904 to the non-server type voice packet communication device 1' according to the IP address data 903. Since the IP address data 903 includes the IP address on the NAT 60 and the port used by the non-server type voice packet communication device 1' on the NAT 60, the non-server type voice packet communication devices 1 and 1' can transmit messages back and forth to establish a voice transmission channel. Thus, the voice packet 904 can correctly reach the non-server type voice packet communication device 1'.

Figure 5:
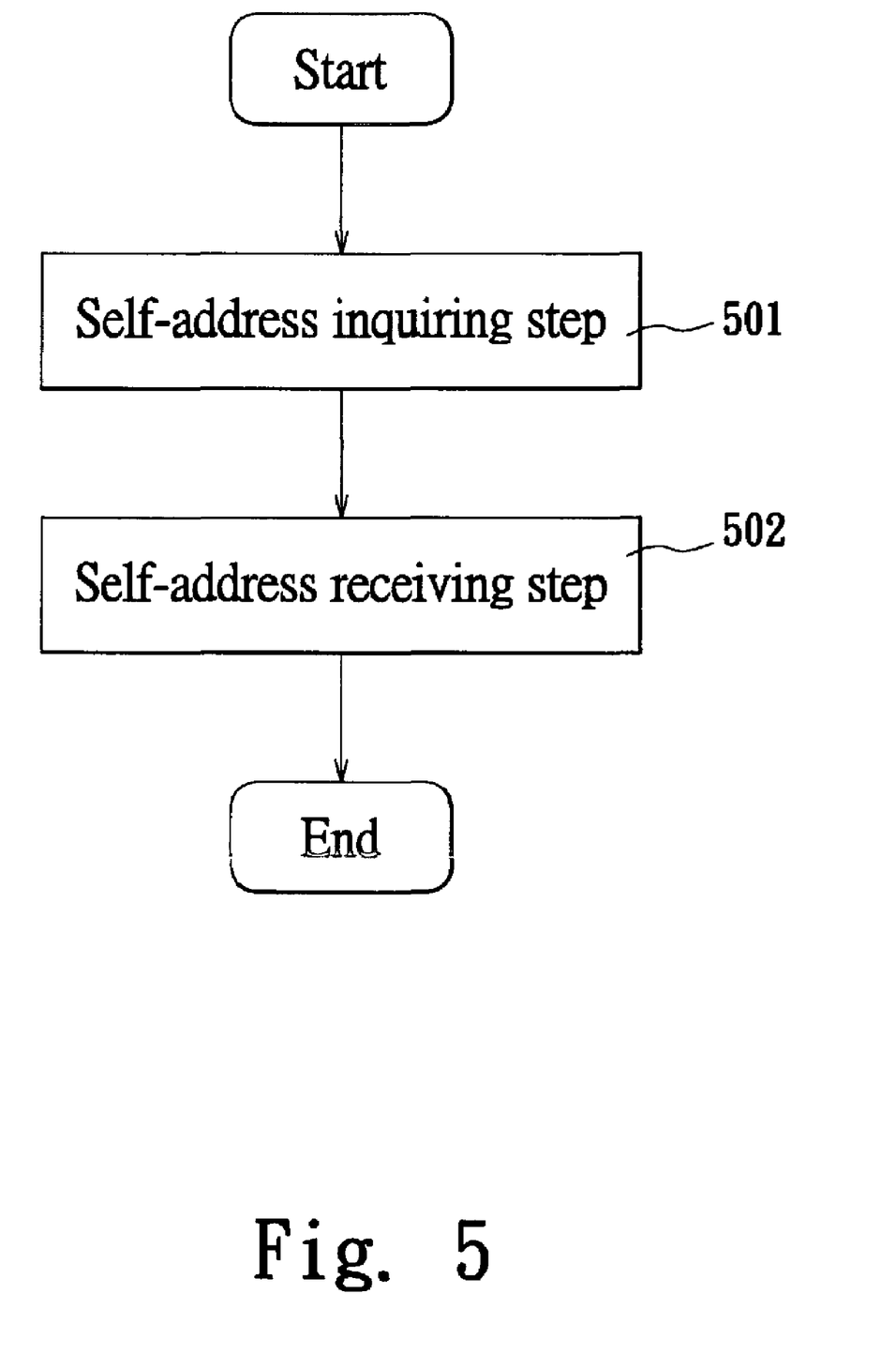
FIG. 5 is a flowchart showing the procedure of the non-server type voice packet communication device inquiring NAT for its IP address according to a preferred embodiment of the invention.

With reference to FIG. 5, when the non-server type voice packet communication device 1' is turned on, it has to know what its IP address on the NAT 60 is and the port it uses on the NAT 60 is. Therefore, when the IP address-inquiring signal 902 is received over PSTN, the IP address data 903 can be sent to the non-server type voice packet communication device 1. Accordingly, when turned on, the non-server type voice packet communication device 1' first performs the self-address inquiring step 501. It transmits a self-address inquiring packet to an IP address analyzer 90. After the NAT 60 receives the self-address inquiring packet, the packet is sent to the IP address analyzer 90 through the port used by the non-server type voice packet communication device 1' on the NAT 60. The IP address analyzer 90 then obtains from the received packet header the IP address and the port used by the non-server type voice packet communication device 1' on the NAT 60. The IP address data 903 is then sent back to the non-server type voice packet communication device 1' through the NAT 60. The non-server type voice packet communication device 1' receives the IP address and the port sent from the NAT 60 in the self-address receiving step 502 and stores the two data for further inquiries.

The non-server type voice packet communication device can inquire about the IP address information (including the LAN IP address and the corresponding WAN IP address on the NAT) of another non-server type voice packet communication device over PSTN. Therefore, the two non-server type voice packet communication devices can still make Internet phone calls to one another even if they are connected to digital network using a NAT.

The non-server type voice packet communication device allows users to make Internet phone calls in the same way conventional callers dial a phone number. That is, users only need to memorize telephone numbers and dial the phone numbers as before to make Internet phone calls. Thus, the invention greatly simplifies the uses of Internet phone calls.

It should be mentioned that a person familiar with the technologies could make equivalent changes and modifications without departing from the spirit and purview of the invention. For example, some NAT designs can have more than two IP addresses and can make conversions for the non-server type voice packet communication device IP addresses. Under this situation, the non-server type voice packet communication device still has a unique IP address for other electronic devices on digital network. The IP address is, however, an IP address converted by the NAT. In other words, the NAT does not distinguish the non-server type voice packet communication devices according to the ports. At the moment, the IP address can only include the NAT-converted IP address of the non-server type voice packet communication device, but not the port used by the non-server type voice packet communication device on the NAT.

Furthermore, although a software module represents each functional module in the above embodiment, a skilled person can make all or some of the software modules into a specific hardware, such as an ASIC (Application-Specific Integrated Circuit) chip to implement the same function.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A non-server voice packet communication method, which comprises:
   an IP address inquiring step, which transmits an IP address inquiring signal to a non-server voice packet communication device;
   an IP address analyzing step, which determines whether an IP address data is transmitted from the non-server voice packet communication device using digital modulation signals or not;
   an IP address receiving step, which receives the IP address data transmitted from the non-server voice packet communication device when the non-server voice packet communication device transmits the IP address data using digital modulation signals; and
   a voice packet transmitting step, which transmits at least one voice packet to the non-server voice packet communication device according to the IP address data.

2. The method of claim 1, further comprising:
   a telephone number receiving step, which receives a telephone number from a first telephone; wherein the IP address inquiring step transmits the IP address inquiring signal to the non-server voice packet communication device according to the telephone number.

3. The method of claim 1, further comprising:
   an IP address recording step, which records the IP address data in an IP address record table that stores the correspondence relations between the IP address data and a telephone number; and
   a correspondence record inquiring step, which checks whether the correspondence relation for the IP address data and the telephone number already exists in the IP address record table and transmits to voice packet according to the IP address data stored in the IP address record table when the relation exists.

4. The method of claim 1, further comprising:
   a checking step, which checks whether the voice packet is successfully sent to the non-server voice packet communication device.

5. The method of claim 4, wherein the IP address inquiring step is performed when the voice packet cannot be successfully sent to the non-server voice packet communication device.

6. The method of claim 1, wherein the non-server voice packet communication device couples to an NAT (Network Address Translator), and the non-server voice packet communication device receives the voice packet transmitted in the voice packet transmitting step.

7. The method of claim 6, further comprising:
   transmitting a self-address inquiring packet from the non-server voice packet communication device to the NAT; and
   receiving the IP address data transmitted from the NAT according to the self-address inquiring packet to the non-server voice packet communication device.

8. The method of claim 7, wherein the self-address inquiring packet is transmitted to an IP address analyzer through the NAT, and the IP address analyzer sends the IP address data in the header of the self-address inquiring packet back to the non-server voice packet communication device.

9. The method of claim 6, wherein the IP address data include the IP address of the NAT, the port used by the non-server voice packet communication device on the NAT, and the IP address of the non-server voice packet communication device.

10. The method of claim 1, wherein the IP address analyzing step determines whether the IP address data is transmitted using FSK (frequency-shift keying) signals, and the IP address receiving step receives the IP address data when the IP address data is transmitted using FSK.

11. A non-server voice packet communication device, which comprises:
    an IP address inquiring module, which transmits an IP address inquiring signal to a second non-server voice packet communication device;
    an IP address analyzing module, which determines whether an IP address data is transmitted from the second non-server voice packet communication device using digital modulation signals or not;
    an IP address receiving module, which receives the IP address data transmitted from the second non-server voice packet communication device when the second non-server voice packet communication device transmits the IP address data using digital modulation signals; and
    a voice packet transmitting module, which transmits at least one voice packet to the second non-server voice packet communication device according to the IP address data.

12. The device of claim 11, further comprising:
    a telephone number receiving module, which receives a telephone number from a first telephone; wherein the IP address inquiring module transmits the IP address inquiring signal to the non-server voice packet communication device according to the telephone number.

13. The device of claim 11, further comprising:
    an IP address recording module, which records the received IP address data in an IP address record table that stores the correspondence relations between the IP address data and a telephone number; and
    a correspondence record inquiring module, which checks whether the correspondence relation for the IP address data and the telephone number already exists in the IP address record table and transmits to voice packet according to the IP address data stored in the IP address record table when the relation exists.

14. The device of claim 13, further comprising:
    a checking module, which checks whether the voice packet is successfully sent to the second non-server voice packet communication device.

15. The device of claim 11, wherein the second non-server type voice packet communication device couples to an NAT, and the second non-server voice packet communication device receives the voice packet through the NAT.

16. The device of claim 15, further comprising:
a self-address inquiring module, which transmits a self-address inquiring packet to the NAT.

17. The device of claim 16, wherein the self-address inquiring packet is transmitted to an IP address analyzer through the NAT, and the IP address analyzer sends the IP address data in the header of the self-address inquiring packet back to the non-server voice packet communication device.

18. The device of claim 16, wherein the IP address data include the IP address, the port used by the second non-server voice packet communication device on the NAT, and the IP address of the non-server voice packet communication device.

19. The device of claim 11, wherein the IP address analyzing module determines whether the IP address data is transmitted using FSK signals, and the IP address receiving module receives the IP address data when the IP address data is transmitted using FSK.

20. The device of claim 11, further comprising:
an IP address outputting module, which transmits an IP address data of the non-server voice packet communication device to the second non-server voice packet communication device using digital modulation signals.

* * * * *